Feb. 7, 1950  J. J. HOST  2,496,724
SLIDE CARRIER
Filed June 4, 1947
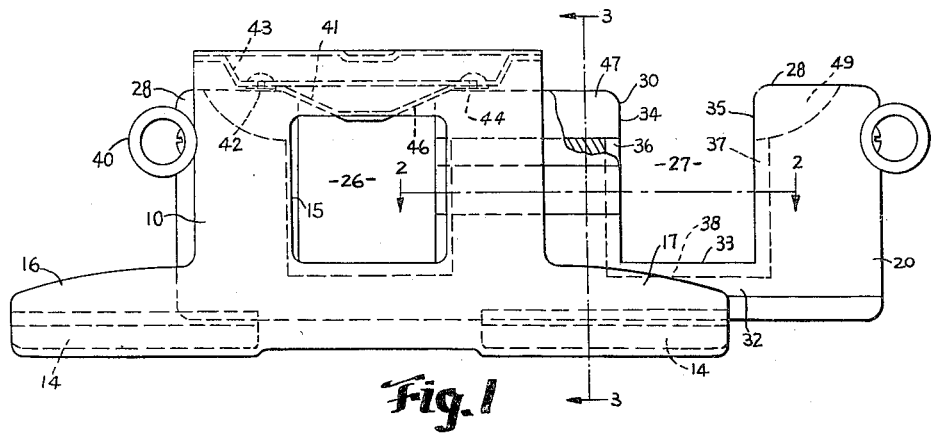
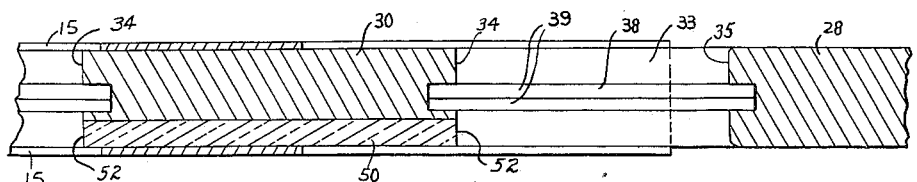
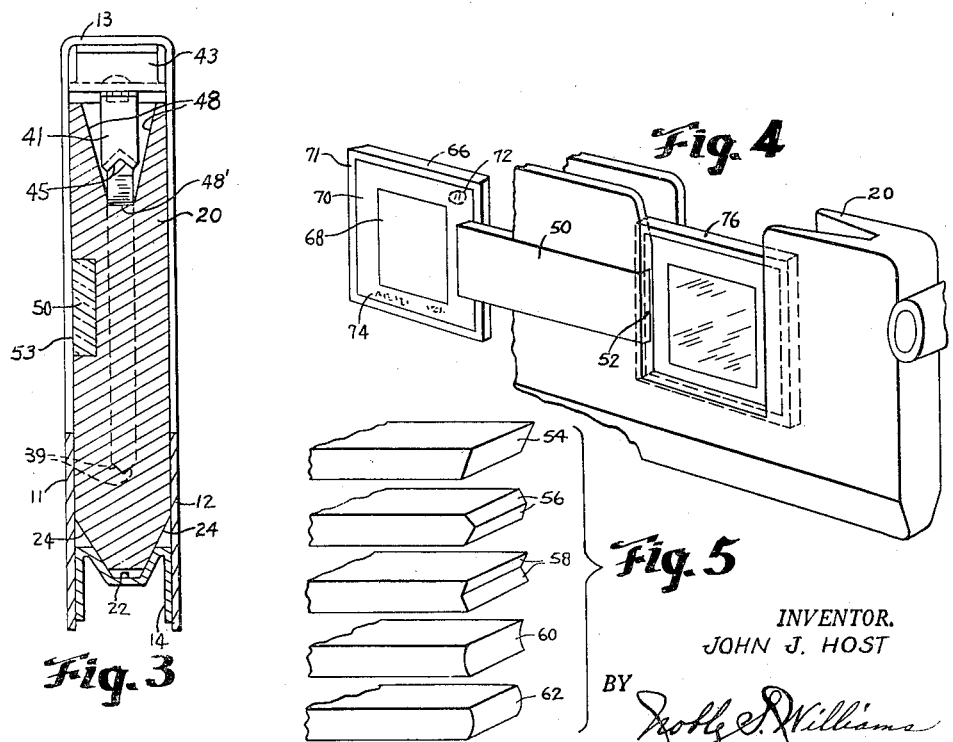
INVENTOR.
JOHN J. HOST
BY
ATTORNEY Patented Feb. 7, 1950

2,496,724

UNITED STATES PATENT OFFICE 2,496,724

SLIDE CARRIER

John J. Host, Lincolnwood, Ill., assignor to American Optical Company, Southbridge, Mass., a voluntary association of Massachusetts Application June 4, 1947, Serial No. 752,411

4 Claims. (Cl. 88—28)

This invention relates generally to photograph slide projectors and the like. More particularly it relates to a slide carrier having means for facilitating the loading of transparent lantern slides into and the removal of such slides from the carrier during its use in an associated projector, the structure also facilitating the inspection of the lantern slides in regions near the projector during the operation thereof.

Many transparent projectors in common use today are of a type arranged to project individual transparent lantern slides or the like and employ for this purpose slide carriers arranged to move transversely of its projector, usually in guide ways therein, for successively positioning slides into the projection position of the instrument. Such projectors are intended for use in darkened rooms and, in order to give the best results, are well enclosed and shielded to prevent objectionable stray light from shining out into the room while still allowing a sufficient flow of air therethrough for cooling purposes. During the use of such projectors, however, it has been found difficult or at least awkward at times for the operator to select particular slides from a collection of slides or to read descriptive matter, slide numbers, dates or the like often used on the marginal portions of the slides for reference purposes. Also under the darkened condition of the room, it has been difficult to see the slide receiving apertures of the slide carrier and even more difficult to see the grooves or other guiding means generally provided adjacent the apertures and into which the slides must be placed when they are to be projected. Furthermore, the inserting or removal of slides from the carrier when accomplished mostly by the sense of touch, often results in objectionably jarring of the slide in the carrier and being projected.

It is, accordingly, an object of the present invention to provide for use with slide projectors or the like a slide carrier for transporting transparent lantern slides into the projection position in the projector and means associated with the carrier for facilitating the inspection of such lantern slides at a location or locations adjacent each loading position of the carrier and under the darkened conditions normally employed during the projection of such slides.

It is a further object of the invention to provide for slide projectors of the class described efficient and economical means in the form of a slide carrier for transporting lantern slides into the projection position in a projector and means associated with the carrier for illuminating the slide receiving apertures therein and parts of the carrier adjacent the apertures by light received from the interior of the projector when each aperture is located at its loading position.

Other objects and advantages of the invention will become apparent from the detailed description which follows when taken in conjunction with the accompanying drawing in which:

Fig. 1 is an elevational view of a supporting and guiding frame and an associated slide carrier, part of the carrier being broken away to better show details of construction;

Fig. 2 is a transverse sectional view of a portion of the supporting frame and slide carrier of Fig. 1, taken substantially on section line 2—2 thereof;

Fig. 3 is a vertical sectional view of the structure of Fig. 1, taken substantially upon section line 3—3 thereof;

Fig. 4 is a fragmentary perspective view to more clearly show the general relation of slides in the carrier and the illuminating or light transmitting means therefor; and Fig. 5 shows perspective views of modifications of the light transmitting means of Figs. 1 to 4.

Referring to the drawing in detail it will be seen that a structure embodying the invention comprises a hollow supporting and guiding frame 10 which is preferably formed of sheet metal and consists of a pair of side plates 11 and 12 integrally connected at their upper edges by an upper wall or plate member 13 and rigidly secured together along their lower portions by inverted channel shaped members 14. These members may be secured to the side plates 11 and 12 by welding, brazing or the like and thus provide a relatively rigid structure. In each of the side plates 11 and 12 there is provided a centrally located projection opening 15 and at either side of these openings the side plates are laterally extended, as indicated at 16 and 17, to provide outwardly projecting pairs of supporting arms. The supporting frame 10 may be positioned in the transverse opening or chamber provided in a conventional projector for such purpose and within the supporting frame is slidably positioned a slide carrier 20.

The channel shaped members 14, as clearly shown in Fig. 3, are provided centrally thereof with substantially V-shaped grooved portions 22 which are of such size and shape that the sloping walls thereof will slidably receive and support the lower complementary sloping walls 24 so as to be exactly centered thereby. Slight clearance is allowed between the side plates of the carrier and the side walls so as to allow free transverse sliding movement of the carrier 20 with a minimum of play or side-to-side movement of the upper edge of the carrier.

The slide carrier 20 is provided with a pair of projection apertures 26 and 27 formed by a pair of upstanding end members 28 and an upstanding intermediate member 30 which are interconnected by rigid beam or bar portions 32. The intermediate member 30 is of such width that the apertures 26 and 27 are spaced sufficiently to allow a slide positioned in one aperture to be projected while another slide is being placed in or removed from the other of said apertures. Each projection aperture 26, or 27, is formed by a bottom wall 33 and spaced vertical side walls 34 and 35. Grooves 36 and 37 are formed in these vertical side walls and are arranged to loosely receive opposite edge portions of a conventional lantern slide therein. An interconnecting groove 38 is formed in the bottom wall 33 and has sloping supporting surfaces 39 (Fig. 3) arranged to form a V-shaped portion so that each slide when positioned in the projection aperture will gravitate toward the bottom of groove 38 and accordingly have its bottom edge centered relative to the vertical transverse plane extending through the center of the slide carrier and the supporting frame. Handles 40 are provided at opposite ends of the carrier 20 for manipulating same and additionally serve to limit the lateral travel of the carrier in both directions.

It will be seen that when a conventional slide, whether to be thick or thin, is slipped into the projection aperture of the carrier, its lower edge will be centered by the sloping surfaces 39 and it will be retained substantially vertically and loosely by the grooves 36 and 37. To cooperate with the slide carrier in moving the slide into an exact predetermined projection position between the openings 15, there is provided additional means in the form of a slide engaging and centering spring member 41 having one end portion thereof fixedly secured, as indicated at 42, to a rigid spacing member 43. The opposite end 44 of the spring member 41 is provided with a slot (not shown) and connected by a pin or rivet to the spacing member 43 so as to allow a limited amount of sliding movement of the end when the central portion of the spring is pressed upwardly. The central portion of the spring member 41 is provided with a V-shaped cross section to provide sloping surfaces 45. Surfaces 45 are arranged to cooperate with the surfaces 39 in accurately centering both the upper and lower edges of a slide as it is moved by the carrier into camming engagement with one of the sloping portions 46 of the spring member and then beneath the V-shaped portion 45 and into said projection position. Spacing member 43 is preferably rigidly secured at its opposite end portions to the wall portion 13.

The upper portion of the intermediate part 30 is provided with a groove 47 formed by sloping surfaces 48 and a bottom surface 48' and portions of the end members 28 are partially grooved, as indicated by the numerals 49. Groove 47 provides sufficient clearance for the downwardly extending spring member 41 and grooves 47 and 49 together provide guiding means so that the slides may be more easily slipped into position in apertures 26 and 27. Obviously the slide carrier 20 may be elongated and provided with more than two projection apertures if desired. The above carrier and supporting structure has been more fully shown, described and claimed in copending application No. 746,920, filed May 9, 1947.

To aid the operator during the use of the slide carrier in the projector in a darkened room there is provided means in the form of an elongated transparent member 50 which is preferably formed of plastic, but may be formed of glass, and which is cemented or otherwise secured in place in the intermediate portion 30 of the slide carrier. Member 50 is arranged to extend from one projection aperture 26 to the adjacent aperture 27. This transparent member is preferably located in the rear wall of the slide carrier so as to be positioned adjacent the operator and so arranged that its opposite end surfaces 52 will terminate adjacent the vertical surfaces 34. One end of the member 50 is thereby positioned to "pick up" light from the interior of the projector when the adjacent projection aperture is positioned in the projector beam. A preferred plastic is either clear or a slightly colored methyl methacrylate but similar well-known types of transparent plastics may be used.

Preferably but not necessarily, the outer surface 53, if not imbedded totally within the carrier 20, will be coated with an opaque paint or other means to prevent stray light being emitted therefrom. The end portions 52 are preferably frosted, etched or otherwise rendered minutely irregular so as to more readily pick up the light from the projector beam and transmit same through the member 50 to its opposite end. The ends of the member 50 may be right angular as indicated at 52, when the member is viewed in transverse cross section, or may be beveled slightly as indicated at 54 (Fig. 5) to give a prism effect or even provided with a pair of outwardly extending beveled surfaces 56, or grooved slightly to form surfaces 58. While the surface 52 merely projects the light outwardly in the general region of the exposed aperture 26 or 27, as the case may be, the surface 54 may serve to direct the light angularly more toward the exposed aperture of the carrier. In the case of the surfaces 56, as well as surfaces 58, the angularity thereof may be such that the light projected thereby may shine partly toward the exposed aperture and partly toward a region adjacent the aperture so as to illuminate a slide held near said aperture.

Also, it will be appreciated that concaved or convexed cylindrical surface portions, as indicated respectively at 60 and 62, may be employed if desired and curved to spread the light transmitted by the member 50 for illuminating the exposed aperture as well as an area near said aperture. The opposite similarly shaped end of the light transmitting member 50 will be at such time, positioned in the projector so as to pick up light from the projector interior. Obviously the shaping of the ends of the member 50, as well as the height and thickness of this member, will be controlled by the amount of light desired at the exposed aperture.

In Fig. 4 there is shown a conventional lantern slide 66 which may have a picture carrying portion 68 surrounded by the customary mat 70 and securing frame 71. A reference number and descriptive matter, as indicated at 72 and 74, are often employed upon such slides. If 76 indicates a slide positioned by the carrier 20 in the projection position in a projector and light is being projected through the picture carrying portion of slides 76, it will be seen that a certain amount of light will be picked up by the end 52 adjacent slide 76, will be transmitted through the member 50 and will be projected from the other end thereof to illuminate parts of the slide receiving aperture adjacent thereto for aiding in the positioning of the slide in the aperture or for inspection of the slide when held near the illuminated aperture. It will be appreciated that when a two aperture type of slide carrier is being employed and one aperture is in its loading position at one side of the projector substantially no light will be emitted from the opposite side of the projector.

While slide carrier 20 is a preferred construction and serves to disclose the nature of the invention, it will be obvious to persons skilled in the art that the slide and aperture illuminating means may be readily adapted to and employed advantageously in other types of slide carriers, such as a slidable type of carrier having more than two slide apertures in alignment or a rotatable disc type carrier having two or more apertures equally spaced from its center of rotation.

Having described my invention, I claim:

1. A slide carrier adapted to receive and transport transparent lantern slides or the like into a projection position in an associated slide projector, said slide carrier having a plurality of slide receiving apertures arranged in adjacent relation thereon, each adjacent a pair of apertures being so spaced relative to each other by an intermediate portion of said carrier that a slide in one aperture may be positioned in the projector for projection purposes while an adjacent aperture thereof is positioned so as to allow another slide to be placed in or removed from said adjacent aperture, and light transmitting means operatively carried by said intermediate portion of said slide carrier and arranged to extend between said adjacent apertures for transmitting light from the region adjacent one aperture to the region adjacent the other of said apertures.

2. A slide carrier adapted to receive and transport transparent lantern slides or the like into a projection position in an associated slide projector, said slide carrier having a plurality of slide receiving apertures formed therein, said apertures being so spaced in adjacent relation relative to each other that a slide in one aperture may be positioned in the projector for projection purposes while an adjacent aperture thereof is positioned so as to allow another slide to be placed in or removed from said adjacent aperture, and means in the form of an elongated transparent member carried by such slide carrier and arranged to extend between adjacent apertures for transmitting light from the region adjacent one aperture to the region adjacent the other of said apertures.

3. A slide carrier adapted to receive and transport transparent lantern slides or the like into a projection position in an associated slide projector, said slide carrier having a plurality of slide receiving apertures formed therein, said apertures being so spaced in adjacent relation relative to each other that a slide in one aperture may be positioned in the projector for projection purposes while an adjacent aperture thereof is positioned so as to allow another slide to be placed in or removed from said adjacent aperture, and means in the form of an elongated transparent member carried by said slide carrier and arranged to extend between said apertures for transmitting light from the region adjacent one aperture to the region adjacent the other of said apertures, the opposite ends of said transparent member being shaped and finished so that either will readily pick up light from the interior of the projector while the other projects said light toward said adjacent aperture.

4. A slide carrier adapted to receive and transport transparent lantern slides or the like into a projection position in an associated slide projector, said slide carrier having a plurality of slide receiving apertures arranged in adjacent relation thereon, each adjacent pair of apertures being so spaced relative to each other by an intermediate portion of said carrier that a slide in one aperture may be positioned in the projector for projection purposes while an adjacent aperture thereof is positioned so as to allow another slide to be placed in or removed from said adjacent aperture, and means in the form of an elongated transparent member of plastic material positioned in said intermediate portion of the carrier and arranged to extend from a location adjacent one of said apertures to a location adjacent another of said apertures, the ends of said transparent member being shaped so that light from a region adjacent one of said apertures may be readily transmitted through said plastic member to a region adjacent other of said apertures for illuminating same.

JOHN J. HOST.

REFERENCES CITED

The following references are of record in the file of this patent:

UNITED STATES PATENTS

| Number | Name | Date |
| --- | --- | --- |
| 1,012,945 | Warner | Dec. 26, 1911 |
| 2,065,059 | Lima | Dec. 22, 1936 |
| 2,195,423 | Powell | Apr. 2, 1940 |
| 2,360,138 | Johnson | Oct. 10, 1944 |